(12) United States Patent
Matsumoto et al.

(10) Patent No.: US 7,242,110 B2
(45) Date of Patent: Jul. 10, 2007

(54) CONTROL SYSTEM FOR CANCELING LOAD UNBALANCE OF THREE-PHASE CIRCUIT

(75) Inventors: Tadashi Matsumoto, Osaka (JP); Mitsuru Mitani, Tokyo (JP); Seiji Tange, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 407 days.

(21) Appl. No.: 10/718,516

(22) Filed: Nov. 24, 2003

(65) Prior Publication Data

US 2004/0196604 A1 Oct. 7, 2004

(30) Foreign Application Priority Data

Apr. 4, 2003 (JP) ............... 2003-101507

(51) Int. Cl.
*H02J 3/26* (2006.01)
(52) U.S. Cl. ..................................... 307/14
(58) Field of Classification Search ............... 307/14
See application file for complete search history.

(56) References Cited

U.S. PATENT DOCUMENTS

| | | | | |
|---|---|---|---|---|
| 3,555,290 | A | * | 1/1971 | Ellermeyer .............. 307/65 |
| 5,604,385 | A | | 2/1997 | David |
| 6,018,203 | A | * | 1/2000 | David et al. ............ 307/52 |
| 6,894,468 | B1 | * | 5/2005 | Bretz et al. ............ 323/274 |
| 2003/0002590 | A1 | * | 1/2003 | Kaku et al. ............ 375/285 |
| 2004/0263147 | A1 | * | 12/2004 | Piesinger .............. 324/86 |

FOREIGN PATENT DOCUMENTS

| | | | |
|---|---|---|---|
| JP | 61-266020 A | | 11/1986 |
| JP | 4-285413 A | | 10/1992 |
| JP | 05126881 A | * | 5/1993 |
| JP | 11-205998 A | | 7/1999 |
| JP | 2000-514279 A | | 10/2000 |
| WO | WO 9637940 | | 11/1996 |

OTHER PUBLICATIONS

Electrical Engineering Handbook, Jan. 25, 1967, The Institute of Electrical Engineerings of Japan.

* cited by examiner

*Primary Examiner*—Chau N. Nguyen
*Assistant Examiner*—Dru Parries
(74) *Attorney, Agent, or Firm*—Sughrue Mion, PLLC

(57) ABSTRACT

A control system for canceling load unbalance of a three-phase circuit includes phase current detectors for detecting phase currents caused to flow through a secondary circuit of a current transformer provided in high voltage distribution lines, respectively, phase change-over switches through which phases of the high voltage distribution lines, and primary sides of distribution transformers provided across high and low voltage distribution lines are connected to each other, a control center for, when a magnitude of a zero-phase current detected by the zero-phase current detector is larger than a predetermined value, on the basis of the phase currents, respectively, out putting a control signal so that the load of the phase having a maximum current appearing therein is changed over to the phase having a minimum current recognized therein, and a phase change-over slave station for controlling the phase change-over for the phase change-over switches in accordance with the control signal.

3 Claims, 14 Drawing Sheets

FIG. 8

| PATTERN NO. | CLASSIFICATION | OUTPUT CONTENTS |
|---|---|---|
| 1 | PHASE A FIXING | PART OF PHASE B IS CHANGED OVER TO PHASE C |
| 2 | SAME OF ABOVE | PART OF PHASE C IS CHANGED OVER TO PHASE B |
| 3 | PHASE B FIXING | PART OF PHASE C IS CHANGED OVER TO PHASE A |
| 4 | SAME OF ABOVE | PART OF PHASE A IS CHANGED OVER TO PHASE C |
| 5 | PHASE C FIXING | PART OF PHASE A IS CHANGED OVER TO PHASE B |
| 6 | SAME OF ABOVE | PART OF PHASE B IS CHANGED OVER TO PHASE A |
| 7 | PHASE A BREAK-UP | PART OF PHASE A IS CHANGED OVER TO PHASE B |
| 8 | SAME OF ABOVE | PART OF PHASE A IS CHANGED OVER TO PHASE C |
| 9 | SAME OF ABOVE | PART OF PHASE A IS CHANGED OVER TO PHASES B AND C |
| 10 | PHASE B BREAK-UP | PART OF PHASE B IS CHANGED OVER TO PHASE C |
| 11 | SAME OF ABOVE | PART OF PHASE B IS CHANGED OVER TO PHASE A |
| 12 | SAME OF ABOVE | PART OF PHASE B IS CHANGED OVER TO PHASES C AND A |
| 13 | PHASE C BREAK-UP | PART OF PHASE C IS CHANGED OVER TO PHASE A |
| 14 | SAME OF ABOVE | PART OF PHASE C IS CHANGED OVER TO PHASE B |
| 15 | SAME OF ABOVE | PART OF PHASE C IS CHANGED OVER TO PHASES A AND B |

FIG. 9

| INSTALLATION POINT \ PHASE | CURRENT PHASE LOAD (kVA) | | | UPDATED PHASE LOAD (kVA) | | |
|---|---|---|---|---|---|---|
| | A | B | C | A | B | C |
| 001 | 20 | 30 | 20 | 20 | 30 | 20 |
| 002 | 50 | 30 | 20 | 50 | 30 | 20 |
| 003 | 150=100+50 | 100=50+50 | 50=0+50 | 50=0+50 | 100=50+50 | 150=100+50 |
| 004 | 150=100+50 | 150=100+50 | 50=0+50 | 50=0+50 | 150=100+50 | 150=100+50 |
| 005 | 100 | 100 | 50 | 100 | 100 | 50 |
| 006 | 100=50+50 | 100=50+50 | 50=0+50 | 50=0+50 | 100=50+50 | 100=50+50 |
| 007 | 30 | 50 | 20 | 30 | 50 | 20 |
| 008 | 50 | 20 | 20 | 50 | 20 | 20 |
| 009 | 100 | 30 | 30 | 100 | 30 | 30 |
| 010 | 30 | 30 | 20 | 30 | 30 | 20 |
| TOTAL kVA | 780 | 640 | 330 | 530 | 610 | 580 |
| PHASE CURRENT A | 118.2 | 97.0 | 50.0 | 80.3 | 92.4 | 87.9 |
| ZERO-PHASE CURRENT (3I0) A | ((59.2)) | | | ((0.9)) | | |

CONTROL SYSTEM FOR CANCELING LOAD UNBALANCE OF THREE-PHASE CIRCUIT

BACKGROUND OF THE INVENTION

1. Field of the Invention

The present invention relates a control system for canceling load unbalance of a three-phase circuit which is capable of preventing malfunction of an over-current grounding relay (OCGR) due to load unbalance in multiple direct grounding series distribution lines.

2. Description of the Related Art

A conventional closed circuit protector for a secondary side circuit of a current transformer receives as its input a secondary current of the current transformer to compare the secondary current thus inputted thereto with a predetermined current value within the closed circuit protector to thereby detect that a secondary circuit of the current transformer has been disconnected or opened, to form a closed circuit in the form of a short-circuit (refer to a page 1 and FIG. 1 of Japanese Patent Laid-Open No. 11-205998, for example).

The conventional device as described above has no function of comparing loads of phases A, B and C with one another to line these loads up in the order of decreasing load to thereby change a part of the load of the phase having a maximum current over to the load of the phase having a minimum current. Hence, there is a problem in that an over-current grounding relay (OCGR) undergoes malfunction due to load unbalance.

SUMMARY OF THE INVENTION

The present invention has been made in order to solve the problem described above. Then, malfunction of an over-current grounding relay (OCGR) is due to load unbalance among a neutral conductor and loads of a multiple direct grounding series.

An object of the present invention is to provide a control system for canceling load unbalance of a three-phase circuit which is capable of detecting a change of each single-phase load which is changed from moment to moment to change single-phase loads having respective phases over to one another at a high speed (within one to two cycles or so, i.e., within about 20 to 40 msec), i.e., to change single-phase loads having respective phases over to one another within a very short period of time not causing service interruption for any of consumers to thereby balance the loads when viewed in the form of three-phase loads.

According to the present invention, a control system for canceling load unbalance of a three-phase circuit includes: phase current detectors for detecting phase currents caused to flow through a secondary circuit of a current transformer provided in high voltage distribution lines, respectively; a zero-phase current detector for detecting a zero-phase current caused to flow through a residual circuit of the current transformer; and phase change-over switches through which phases of the high voltage distribution lines, and primary sides of distribution transformers provided across high and low voltage distribution lines are connected to each other.

Also, the control system includes: a control center for, when a magnitude of the zero-phase current detected by the zero-phase current detector is larger than a predetermined value, on the basis of the phase currents of the phases detected by the phase current detectors, respectively, outputting a control signal so that the load of the phase having a maximum current appearing therein is changed over to the phase having a minimum current recognized therein; and a phase change-over slave station for controlling the phase change-over for the phase change-over switches in accordance with the control signal.

In the control system for canceling load unbalance of a three-phase circuit according to the present invention, such effects can be obtained that a part of a load of a phase having a maximum current appearing therein can be shifted over to a load of a phase having a minimum current recognized therein to surely cancel unbalance in loads of a three-phase circuit to thereby prevent malfunction of an over-current grounding relay (OCGR).

BRIEF DESCRIPTION OF THE DRAWINGS

In the accompanying drawings:

FIG. 8 is a diagram showing an example of an output pattern of phase change-over in the control system for canceling load unbalance of a three-phase circuit according to Embodiment 1 of the present invention;

FIG. 9 is a diagram showing current phase loads and updated phase loads when the control system for canceling load unbalance of a three-phase circuit according to Embodiment 1 of the present invention is applied to a high voltage power distribution system in a multiple grounding system;

DESCRIPTION OF THE PREFERRED EMBODIMENTS

Embodiment 1

Figure 1:
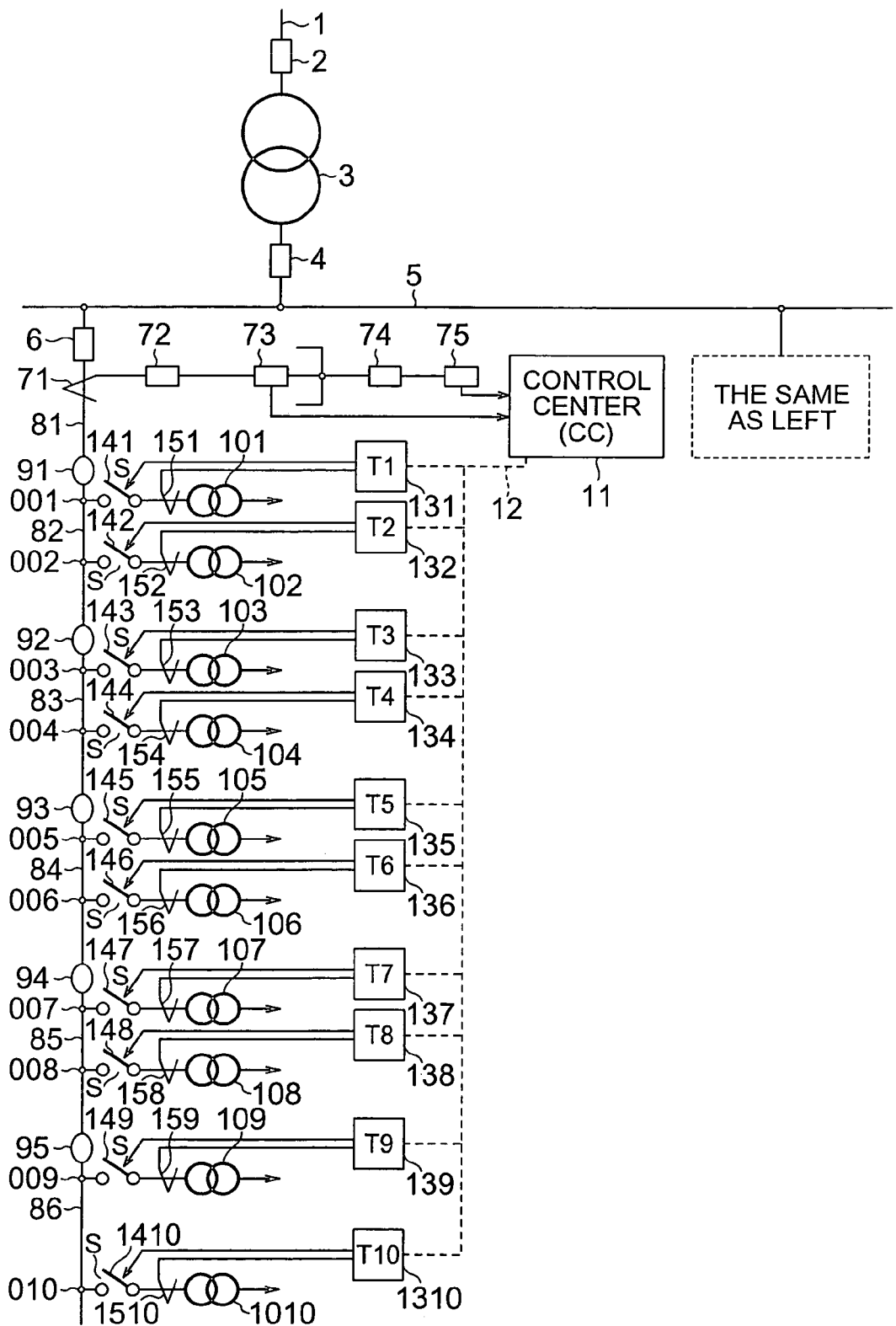
FIG. 1 is a circuit diagram, partly in block diagram, showing a configuration when a control system for canceling load unbalance of a three-phase circuit according to Embodiment 1 of the present invention is applied to a high voltage power distribution system in a multiple grounding system.

A control system for canceling load unbalance of a three-phase circuit according to Embodiment 1 of the present invention is described with reference to the accompanying drawings. FIG. 1 is a circuit diagram, partly in block diagram, showing a configuration when a control system for canceling load unbalance of a three-phase circuit according to Embodiment 1 of the present invention is applied to a high voltage power distribution system in a multiple grounding system. Note that, in the figure, the same reference numerals designate the same or corresponding constituent elements.

In FIG. 1, a receiving line 1 of a distribution station is connected to a receiving circuit breaker 2. A primary side of a main transformer 3 is connected to the receiving circuit breaker 2, and a secondary side thereof is connected to a bank secondary circuit breaker 4. A high voltage bus 5 is connected to the bank secondary circuit breaker 4.

In addition, in FIG. 1, a feeder circuit breaker 6 is connected to the high voltage bus 5. Section switches 91 to 95 are inserted across a first section distribution line 81 to a sixth section distribution line 86 two by two, respectively.

Also, in FIG. 1, a current transformer (CT) 71 is connected to the first section distribution line 81. An over-current relay (OCR) 72 is installed in a secondary circuit of the current transformer (CT) 71. A phase current detector 73 is connected to the over-current relay (OCR) 72. Moreover, an over-current grounding relay (OCGR) 74 is installed in a residual circuit of the current transformer (CT) 71. A zero-phase current detector 75 is connected to the over-current grounding relay (OCGR) 74.

Further, in FIG. 1, single-phase type or three-phase type distribution transformers 101 and 102 are respectively connected to distribution transformer installation points 001 and 002 of a second section distribution line 82.

Likewise, single-phase type or three-phase type distribution transformers 103 and 104 are respectively connected to distribution transformer installation points 003 and 004 of a third section distribution line 83. In addition, single-phase type or three-phase type distribution transformers 105 and 106 are connected to distribution transformer installation points 005 and 006 of a fourth section distribution line 84, respectively. Single-phase type or three-phase type distribution transformers 107 and 108 are connected to distribution transformer installation points 007 and 008 of a fifth section distribution line 85, respectively. Single-phase type or three-phase type distribution transformers 109 and 1010 are connected to distribution transformer installation points 009 and 010 of a sixth section distribution line 86, respectively.

Moreover, in FIG. 1, a control center (CC) 11 is composed of a computer or the like, and is connected to a phase current detector 73, and a zero-phase current detector 75. Phase-change-over slave stations (slave stations: T1 to T10) 131 to 1310 of the distribution transformers 101 and 1010 are connected to the control center (CC) 11 through respective communication lines 12. In addition, phase change-over switches (S) 141 to 1410 are inserted between the distribution transformer installation points 001 to 010 and the distribution transformers 101 to 1010, respectively. Furthermore, current transformers 151 to 1510 capture load currents of the distribution transformers 101 to 1010, respectively, to output the captured load currents to the phase change-over slave stations (T1 to T10) 131 to 1310, respectively.

Then, usually, plural distribution lines (e.g., two to six distribution lines) are generally connected to the same bus 5, and equipment for the distribution lines is similar in configuration to the foregoing. The control center (CC) 11 is installed in every distribution line.

Next, a description will be hereinbelow given with respect to an operation of the control system fir canceling load unbalance of a three-phase circuit according to Embodiment 1 with reference to the accompanying drawings.

The control center (CC) 11 selects a phase (phase A, B or C) requiring a change-over manipulation on the basis of a secondary current of the current transformer (CT) 71. Moreover, the control center (CC) 11 selects one of the distribution transformers 101 to 1010 as an object of change-over, and then transmits a control signal to the slave stations 131 to 1310 through the respective communication lines 12 to control the phase change-over switches 141 to 1410.

It should be noted that since when a load current is extremely less as compared with the equipment capacity, no control effect appears, the current transformers 151 to 1510 for capturing currents of the distribution transformers 101 to 1010 are provided in order to obtain information of necessity/unnecessity of the control.

Now, a description will be hereinbelow given with respect to the phase change-over switch used in the control system for canceling load unbalance of a three-phase circuit with reference to FIG. 2.

Figure 2:
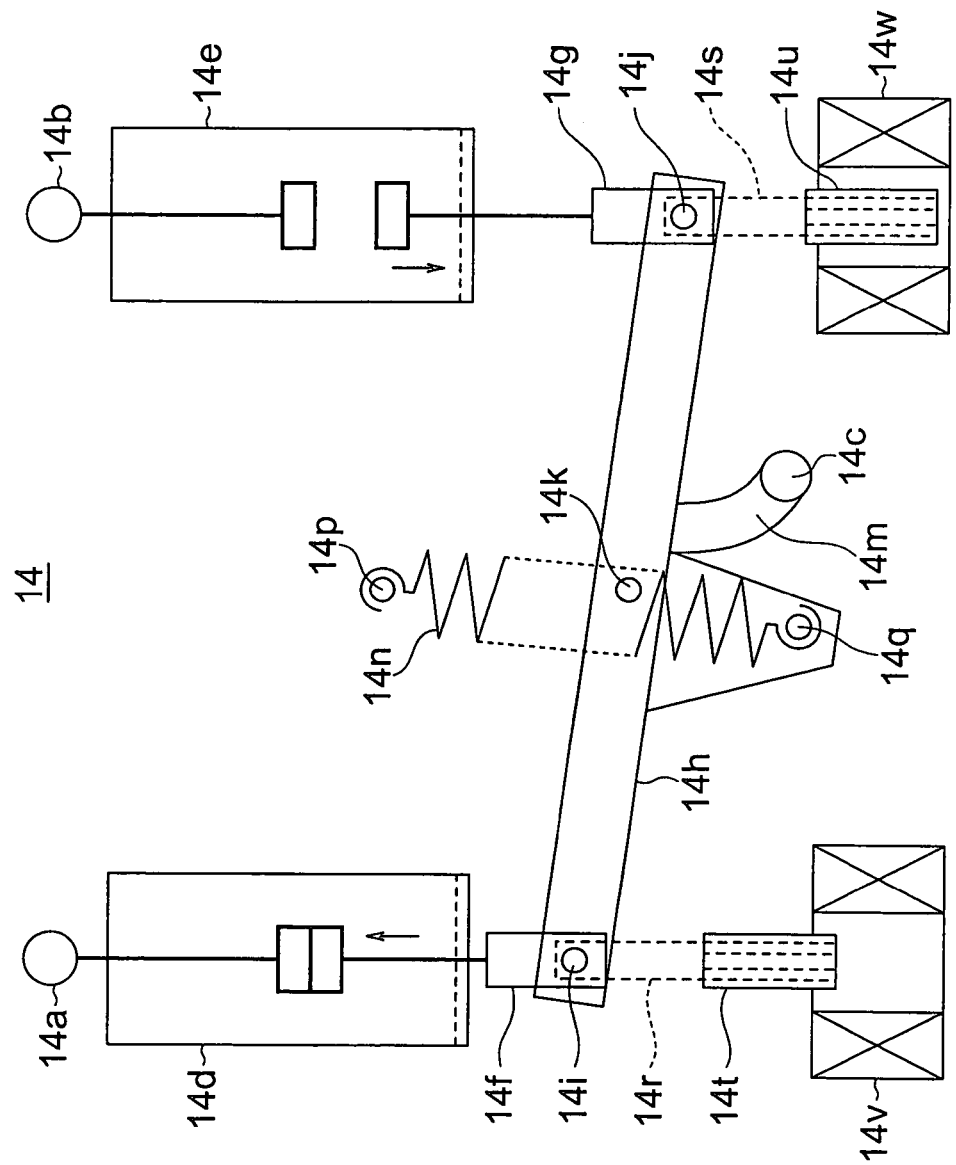
FIG. 2 is a view showing a construction of a phase change-over switch of the control system for canceling load unbalance of a three-phase circuit according to Embodiment 1 of the present invention.

FIG. 2 is a view showing a construction of a phase change-over switch used in the control system for canceling load unbalance of a three-phase circuit according to Embodiment 1 of the present invention.

In FIG. 2, a phase change-over switch 14 has an electrode terminal 14a on one fixing side, an electrode terminal 14b on the other fixing side, and a common electrode terminal 14c on a movable side. In addition, the phase change-over switch 14 has an auxiliary contact which is closed when the fixing side electrode terminal 14a is closed, and an auxiliary contact which is closed when the fixing side electrode terminal 14b is closed.

In addition, in FIG. 2, each of switch main bodies 14d and 14e is composed of a vacuum switch tube, an SF6 gas tube or the like. Conductive manipulation rods 14f and 14g serve to open and close the switch main bodies 14d and 14e, respectively. Also, a balance rod type conductive manipulation rod 14h has manipulation parts linking points 14i and 14j used to manipulate the switch main bodies 14d and 14e, respectively, and a fulcrum 14k.

Moreover, in FIG. 2, a conductor 14m is rich in flexibility. A holding spring 14n has a fixed point 14p for fixing the spring, and a movable side point 14q on a manipulation rod of the spring. In addition, each of manipulation rods 14r and 14s is rich in electrical insulation. Moreover, movable iron cores 14t and 14s great tracted to coils 14v and 14w of electromagnets for manipulation, respectively.

It is shown in FIG. 2 that in the phase change-over switch 14, the left-hand side switch main body 14d (on the side of the fixed side electrode terminal 14a) is in a state of being turned ON, while the right-hand side switch main body 14e (on the side of the fixed side electrode terminal 14b) is in a state of being turned OFF.

In this case, the fixed point 14p and the movable side point 14q, and the holding spring 14n constitute a toggle mechanism. Then, the side of the fixed side electrode terminal 14a holds a closed circuit state, while the side of the fixed side electrode terminal 14b holds an opened circuit state. Thus, such a construction is adopted that the side of the fixed side electrode terminal 14a and the side of the fixed side electrode terminal 14b are not simultaneously closed.

In FIG. 2, in the case where the side of the fixed side electrode terminal 14a is intended to be opened, while the side of the fixed side electrode terminal 14b is intended to be closed, the coil 14v is magnetized to attract the movable iron core 14t. Then, the left-hand side of the manipulation rod 14h goes down through the manipulation rod 14r excellent in insulation so that the fixed point 14p, the movable side point 14q and the holding spring 14n of the toggle mechanism operate to close the side of the fixed side electrode terminal 14b, while they operate to open the side of the fixed side electrode terminal 14a. Thus, the side of the fixed side electrode terminal 14b is held in a closed circuit state.

In accordance with the phase change-over switch 14, the side of the fixed side electrode terminal 14a and the side of the fixed side electrode terminal 14b do not simultaneously form closed circuits. Thus, the phase change-over can be safely, and reliably carried out at high speed.

Next, a description will be hereinbelow given with respect to another phase change-over switch used in the control system for canceling load unbalance of a three-phase circuit with reference to FIG. 3.

Figure 3:
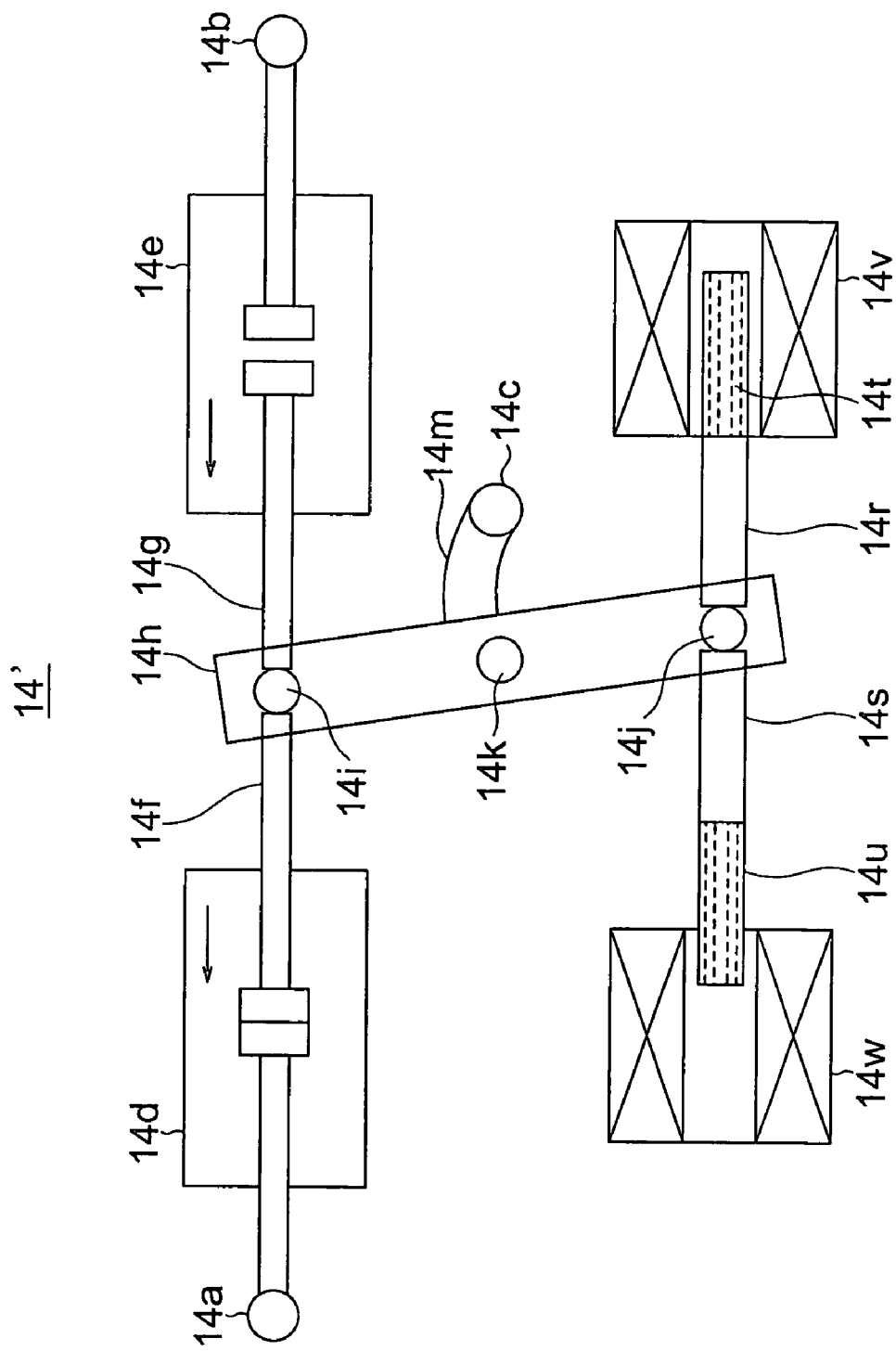
FIG. 3 is a view showing a construction of another phase change-over switch of the control system for canceling load unbalance of a three-phase circuit according to Embodiment 1 of the present invention.

FIG. 3 is a view showing a construction of another phase change-over switch used in the control system for canceling load unbalance of a three-phase circuit according to Embodiment 1 of the present invention.

A phase change-over switch 14' shown in FIG. 3 is such that switch main bodies 14d and 14e are horizontally disposed. However, since the electrodes are confronted with each other in the mechanism, the movable portions are moved symmetrically with respect to the fulcrum 14k. Then, in order to turn ON the switch main body 14d, the coil 14v of the electromagnet is magnetized to attract the movable iron core 14t to thereby attain the purpose. On the other hand, for turning ON the switch 14e, the coil 14w of the electromagnet is magnetized to attract the movable iron core 14u to thereby attain the purpose. It should be noted that while the well-known toggle mechanism is not illustrated in the figure, this phase change-over switch has such a toggle mechanism.

Figure 4:
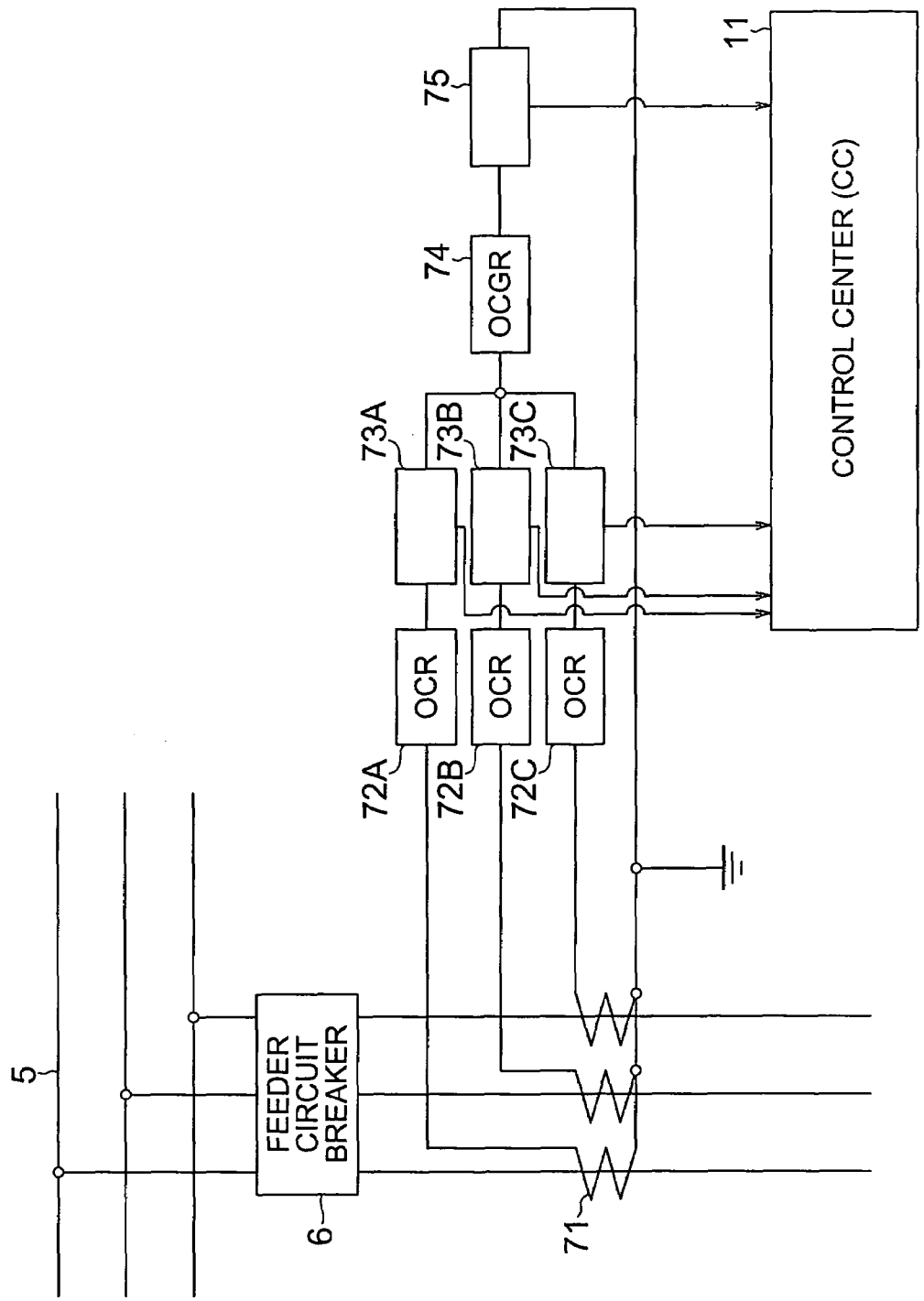
FIG. 4 is a circuit diagram showing a detailed configuration of a part of the control system for canceling load unbalance of a three-phase circuit shown in FIG. 1.

FIG. 4 is a circuit diagram showing a detailed configuration of a part of the control system for canceling load unbalance of a three-phase circuit shown in FIG. 1.

In FIG. 4, over-current relays (OCR) 72A, 72B and 72C are installed for the respective phases of a secondary circuit of the current transformer (CT) 71. Phase current detectors 73A, 73B and 73C of respective phases are connected to those over-current relays (OCR) 72A, 72B and 72C, respectively. In addition, the over-current grounding relay (OCGR) 74 is installed in the residual circuit of the current transformer (CT) 71. The zero-phase current detector 75 is connected to the over-current grounding relay (OCGR) 74.

Then, the phase current detectors 73A, 73B and 73C of respective phases, and the zero-phase current detector 75 are connected to the control center (CC) 11.

Figure 5:
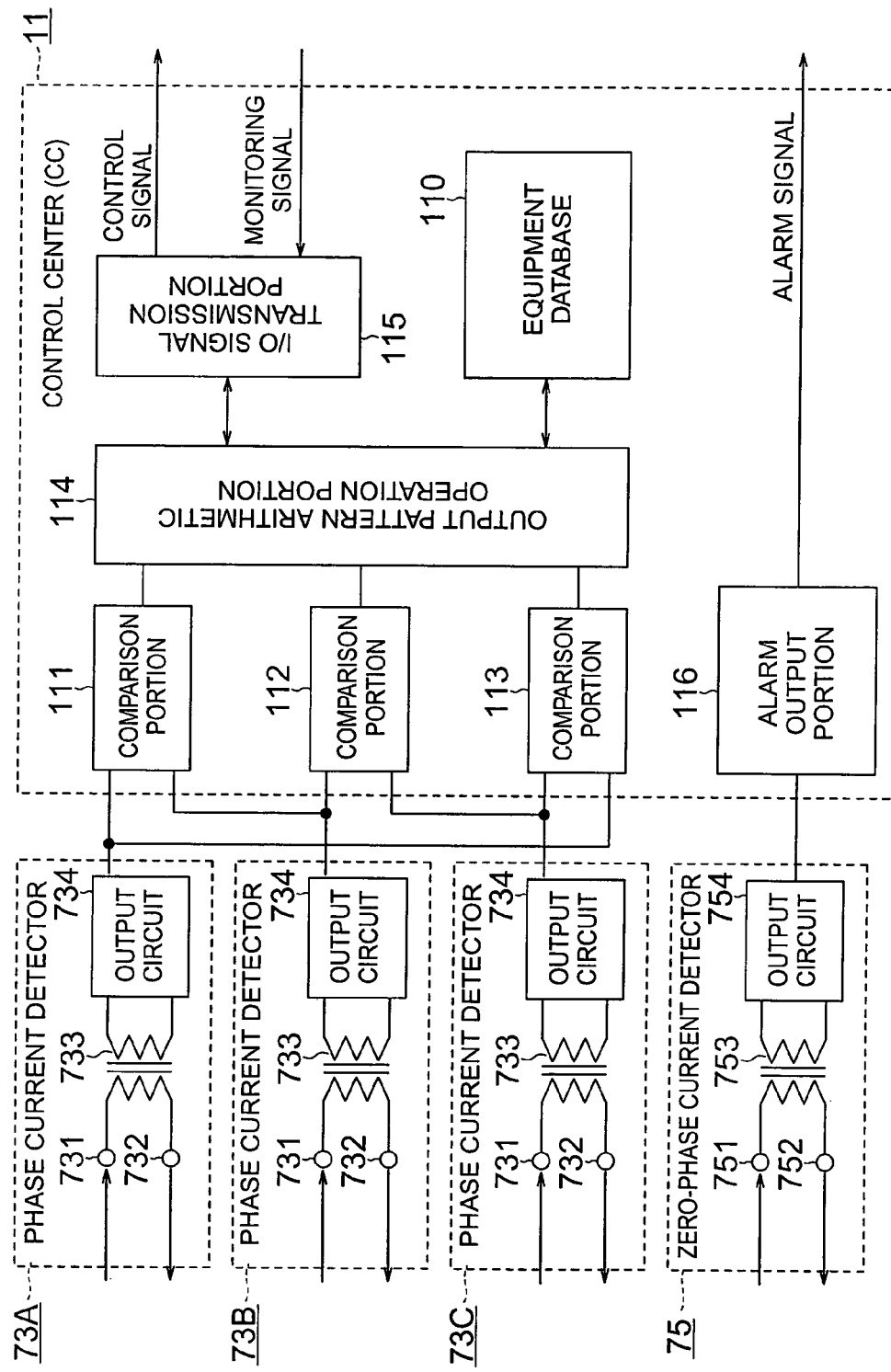
FIG. 5 is a block diagram, partly in a circuit diagram, showing a detailed configuration of phase current detectors, a zero-phase current detector, and a control center of the control system for canceling load unbalance of a three-phase circuit according to Embodiment 1 of the present invention.

FIG. 5 is a block diagram, partly in a circuit diagram, showing a detailed configuration of the phase current detectors, the zero-phase current detector and the control center of the control system for canceling load unbalance of a three-phase circuit according to Embodiment 1 of the present invention.

In FIG. 5, the control center (CC) 11 includes an equipment database 110, comparison portions 111 to 113, an output pattern arithmetic operation portion 114, an input/output signal transmission portion 115, and an alarm output portion 116. Equipment data such as a transformer form, and a capacity for each distribution line is registered in the equipment database 110.

In addition, in FIG. 5, each of the phase current detectors 73A, 73B and 73C of respective phases is constituted by input terminals 731 and 732, an input transformer 733 and an output circuit 734. Also, the zero-phase current detector 75 is constituted by input terminals 751 and 752, an input transformer 753, and an output circuit 754.

Figure 6:
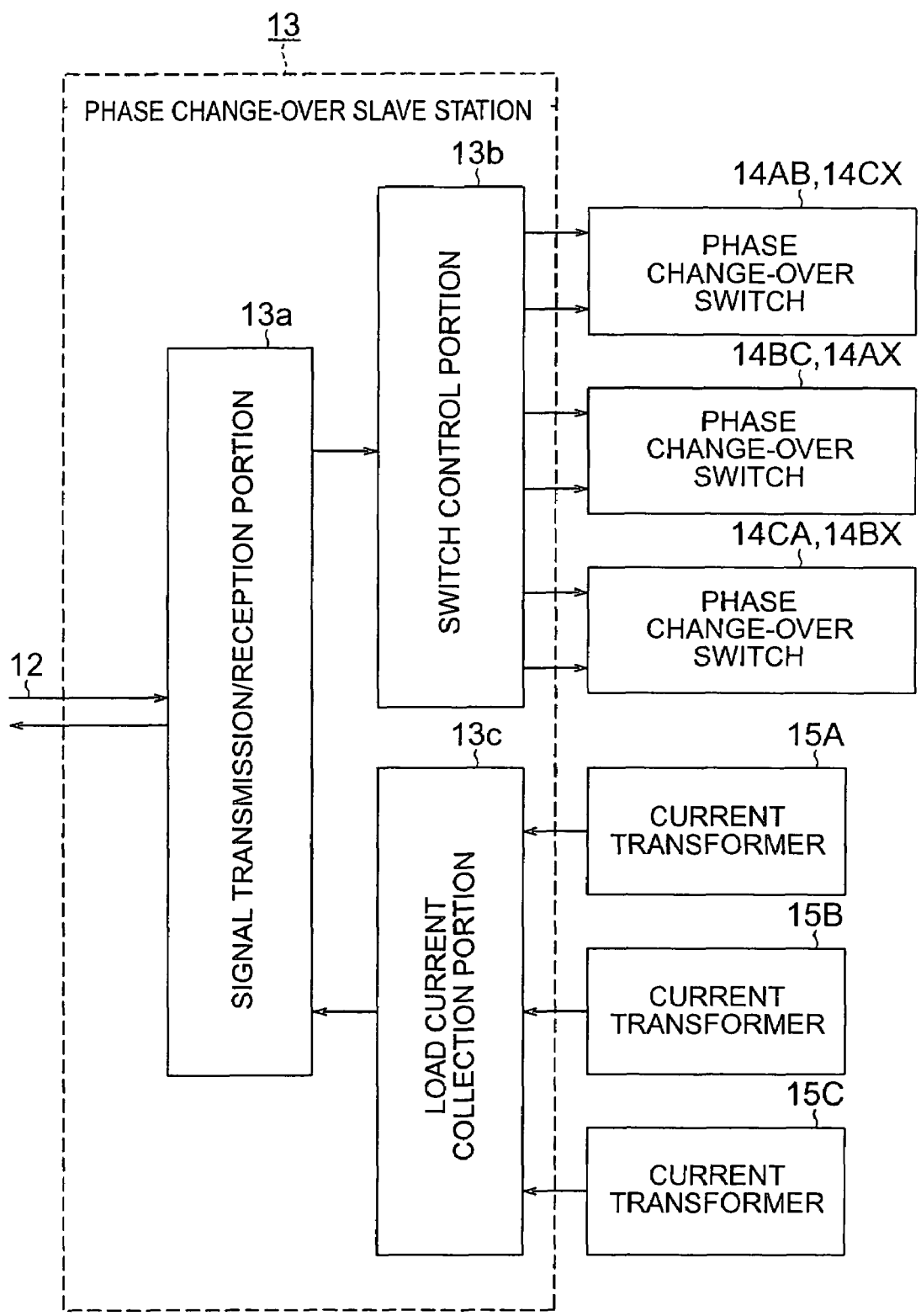
FIG. 6 is a block diagram showing a detailed configuration of a phase change-over slave station of the control system for canceling load unbalance of a three-phase circuit according to Embodiment 1 of the present invention.

FIG. 6 is a block diagram showing a detailed configuration of a phase change-over slave station of the control system for canceling load unbalance of a three-phase circuit according to Embodiment 1 of the present invention.

In FIG. 6, the phase change-over slave station 13 has a signal transmission/reception portion 13a, a switch control portion 13b, and a load current collection portion 13c. It should be noted that the phase change-over slave station 13 is composed of a microprocessor or the like.

The signal transmission/reception portion 13a is connected to the control center 11 through the communication line 12. In addition, the switch control portion 13b is connected to phase change-over switches 14AB, 14CX, 14BC, 14AX, and 14CA, 14BX of respective phases through respective output lines. The switch control portion 13b includes address portions of the phase change-over switches 14AB to 14BX of respective phases, and output relays for controlling the phase change-over switches 14AB to 14BX of respective phases. Moreover, the load current collection portion 13c is connected to circuit transformers 15A to 15C of respective phases in order to collect the load currents of the distribution transformers online.

A description will be hereinbelow given with respect to an operation of the control center of the control system for canceling load unbalance of a three-phase circuit according to Embodiment 1 with reference to the accompanying drawings.

Figure 7:
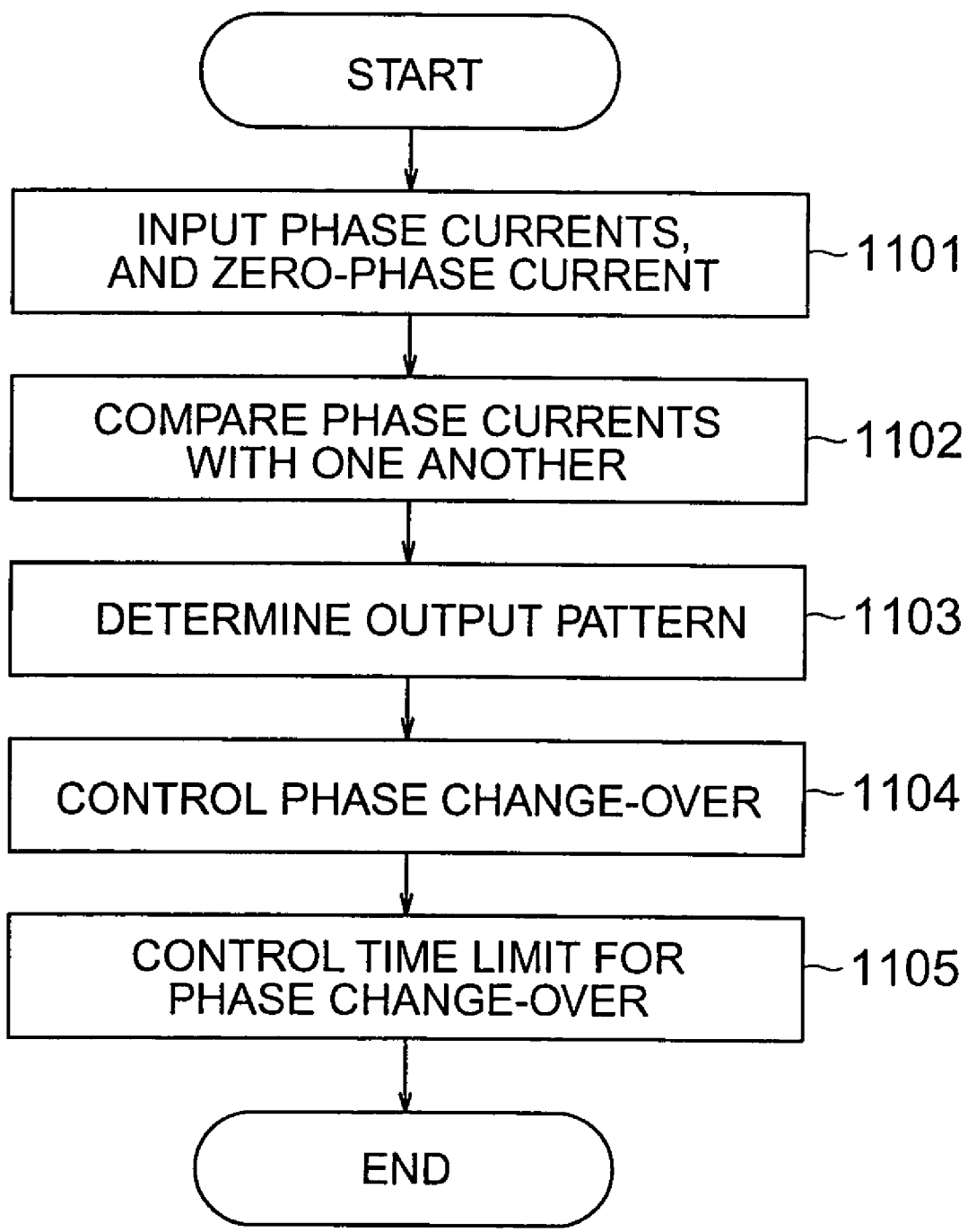
FIG. 7 is a flow chart useful in explaining an operation of a control center of the control system for canceling load unbalance of a three-phase circuit according to Embodiment 1 of the present invention.

FIG. 7 is a flow chart useful in explaining the operation of the control center of the control system for canceling load unbalance of a three-phase circuit according to Embodiment 1 of the present invention.

First of all, in Step 1101, the control center (CC) 11 receives as its input the phase currents of the phases (phases A, B and C) as the secondary currents of the current transformer (CT) 71 from the phase current detectors 73A, 73B and 73C. Also, the control center (CC) 11 receives as its input the zero-phase current from the zero-phase current detector 75.

Next, in Step 1102, when the magnitude of the zero-phase current has become larger than a predetermined value and hence the necessity for doing the phase change-over is caused, the magnitudes of the phase currents of the phases (phases A, B and C) are compared with one another. Then, the control center (CC) 11 compares the magnitude of the current of the phase A and the magnitude of the current of the phase B with each other in the comparison portion 111. Likewise, the control center (CC) 11 compares the magnitude of the current of the phase B and the magnitude of the current of the phase C with each other in the comparison portion 112. Also, the magnitude of the current of the phase C and the magnitude of the current of the phase A are compared with each other in the comparison portion 113.

Next, in Step 1103, an output pattern for phase change-over is determined. Then, the control center (CC) 11 further compares the comparison results from the comparison portions 111, 112 and 113 with one another to judge the phase of a maximum current and the phase of a minimum current in the output pattern arithmetic operation portion 114. That is, the control center (CC) 11 arithmetically operates to which phase the unbalance load should be changed over on the basis of equipment data from the equipment database 110, and current load data (monitoring signal) of the distribution transformers sent from the phase change-over slave station 13. Then, the output pattern arithmetic operation portion 114 arithmetically operates from which phase to which phase how much load requiring change-over and how much phase requiring change-over should be changed over on the basis of a distinction between a single phase and three phases, a capacity and the like of each distribution transformer installed on the distribution lines registered in the equipment database 110, and a quantity of actual load currents of the distribution transformers collected from the field to determine an optimal output pattern for phase change-over agreeing with the arithmetic operation results.

If a relationship of "a difference between a current of phase A and a current of phase B">"a difference between a current of phase B and a current of phase C">"a difference between a current of phase C and a current of phase A" is established, then, for example, an output pattern for the phase change-over of "change of phase A over to phase C" is selected. FIG. 8 is a diagram showing an example of other output patterns for the phase change-over.

Next, in Step 1104, the control center (CC) 11, on the basis of the determined output pattern for the phase change-over, outputs a control signal to the phase change-over slave station 13 corresponding to the phase change-over switch provided in the distribution transformer as an object in the input/output signal transmission portion 115 to speedily carry out the phase change-over control. Note that, after completion of the phase change-over control, the control center (CC) 11 resets a time limit circuit (timer) of the alarm output portion 116. This completion of the phase change-over control is judged when the magnitude of the zero-phase current inputted from the zero-phase current detector 75 has been reduced.

Here, the concrete phase change-over control will hereinbelow be described with reference to FIG. 9.

FIG. 9 is a diagram showing current phase loads and updated phase loads when the control system for canceling load unbalance of a three-phase circuit according to Embodiment 1 of the present invention is applied to a high voltage power distribution system in a multiple grounding system.

In FIG. 9, current phase loads and results of carrying out the phase change-over for cancellation of unbalance loads (updated phase loads) are shown in a left-hand column and a right-hand column, respectively. In addition, a phase current is shown in 100 percentage load when a phase voltage is 6.6 kV (a line voltage is 11.4 kV). Also, in a zero-phase current, the current phases of the respective phases are held at 120 degrees.

Moreover, in FIG. 9, it is shown that the change-over for the single-phase transformers installed in the distribution transformer installation points 003, 004 and 006 were carried out. That is, in case of the distribution transformer installation point 003, the load of current 100 kVA in single-phase+50 kVA in three-phases in the phase A, and the load of current 0 kVA in single phase+50 kVA in three-phases in the phase C are changed over to the load of 0 kVA in single phase+50 kVA in three phases in the phase A after update, and the load of 100 kVA in single phase+50 kVA in three-phases in the phase C after update, respectively.

As shown in FIG. 9, carrying out the change-over of the phase loads greatly improves the zero-phase current (310) from 59.2 A to 0.9 A. In addition, the protection function of the over-current grounding relay (OCGR) 74 becomes able to be shown as an initial objective.

Next, in Step 1105, the control center (CC) 11, in response to a signal from the alarm output portion 116, starts the phase change-over control, and at the same time, drives the time limit circuit (timer) to monitor the limit time. That is, the control center (CC) 11, on the basis of operating time characteristics, obtains a limit time from the detected zero-phase current, and then outputs an alarm signal exhibiting that if the limit time has elapsed, then the over-current grounding relay (OCGR) will undergo the malfunction.

Figure 10:
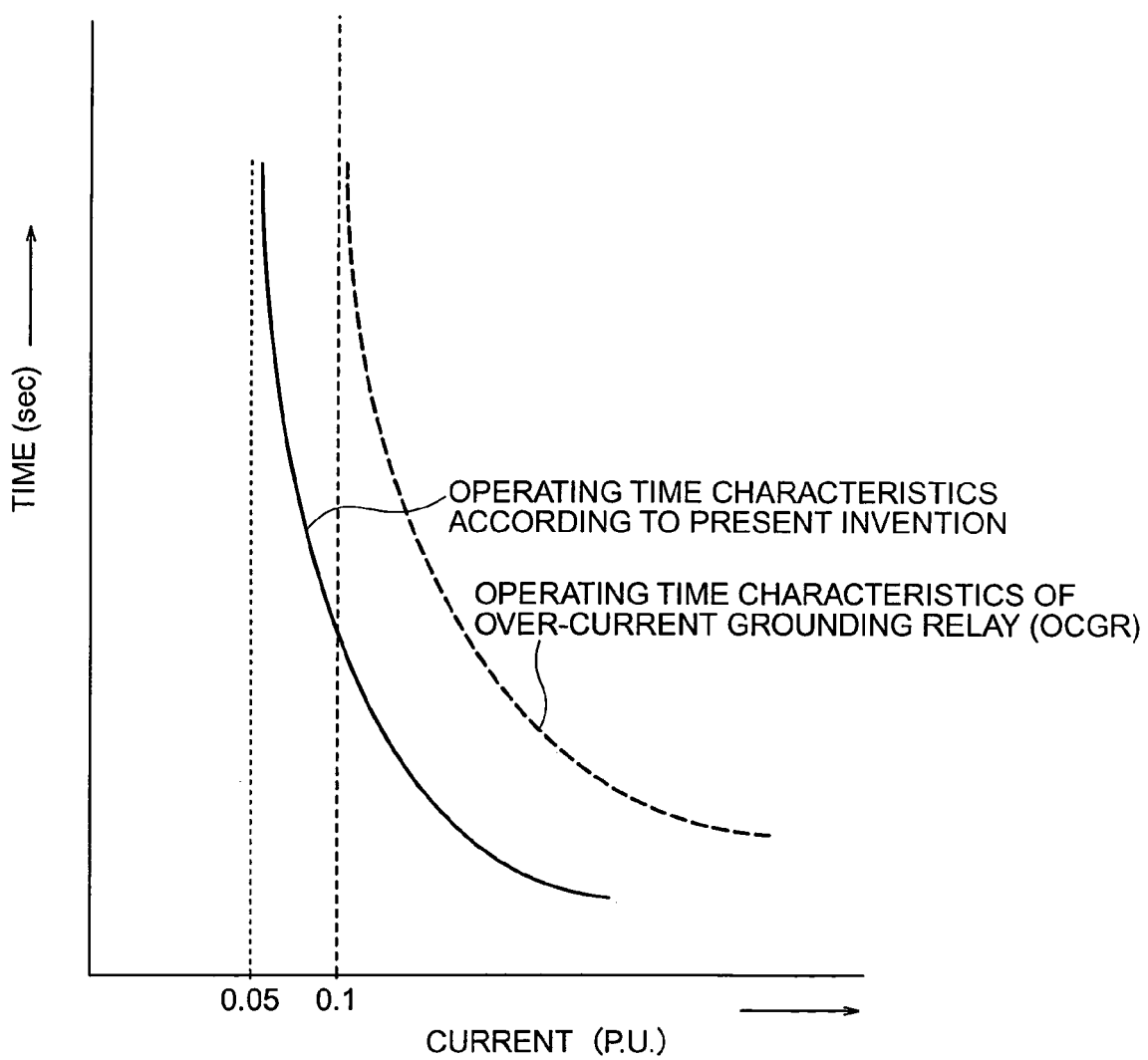
FIG. 10 is a graphical representation useful in explaining a relationship between a limit time and a zero-phase current until completion of phase change-over of a load in the control system for canceling load unbalance of a three-phase circuit according to Embodiment 1 of the present invention.

FIG. 10 is a graphical representation useful in explaining a relationship between a limit time until completion of the phase change-over loads and the zero-phase current on the basis of consideration given to the characteristics of the over-current grounding relay (OCGR).

In FIG. 10, there is shown an example of the operating time characteristics when a secondary rated current of the current transformer (CT) 71 is set to 5A=1C (per unit (P. U.)), for example, and an allowable residual current (a current caused to flow into the OCGR) is set to 0.05 (P. U.) in the case where an operating current set value of the over-current grounding relay (OCGR) 74 is 0.1 (P. U.).

The operating time characteristics correspond to the magnitude of the residual circuit current, i.e., the zero-phase current. Thus, if the phase change-over is controlled so as to meet the operating time characteristics, then the malfunction of the over-current grounding relay (OCGR) can be prevented. In other words, if the phase change-over control is delayed with respect to the operating time characteristics, then the over-current grounding relay (OCGR) will undergo the malfunction.

An over-current relay having anti-time limit characteristics is used in which the general operating time of the over-current grounding relay (OCGR) is 4 seconds when the operating current set value is 150%, and is 1.5 seconds when the operating current set value is 200%. Consequently, the actual control for canceling load unbalance, i.e., the phase change-over control is carried out for a period of time of about 1 to about 3 seconds.

FIGS. 11 to 14 are respectively circuit diagrams showing examples of connection of distribution transformers.

Figure 11:
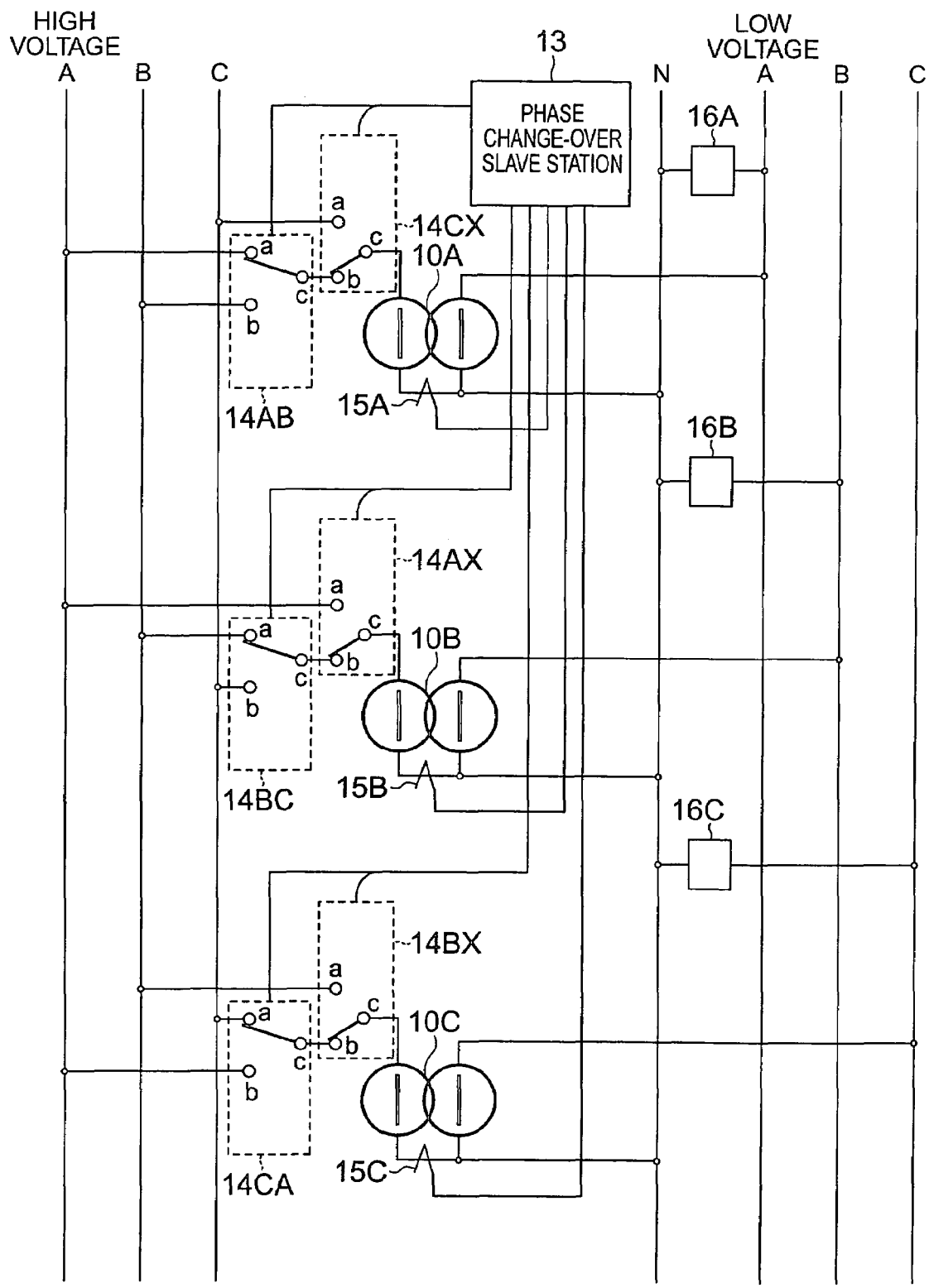
FIG. 11 is a circuit diagram useful in explaining a method of installation of phase change-over switches when single-phase transformers are installed in a certain load point.

FIG. 11 is a circuit diagram useful in explaining a method of installation of phase change-over switches when single-phase transformers are installed at a certain load point.

In FIG. 11, single-phase distribution transformers 10A, 10B and 10C are connected across high voltage three-phase load lines and low voltage single-phase load lines. Single-phase loads 16A, 16B and 16C are connected to the low voltage single-phase load lines of individual phases, respectively. In addition, phase change-over switches 14AB, 14CX, 14BC, 14AX, and 14CA, 14BX are inserted across the high voltage three-phase load lines and the single-phase distribution transformers 10A, 10B and 10C, respectively.

In addition, in FIG. 11, the phase change-over slave station 13 is connected to the phase change-over switches 14AB, 14CX, 14BC, 14AX, and 14CA, 14BX through control lines, respectively, and also are connected to current transformers (CT) 15A, 15B and 15C for monitoring the load currents of the distribution transformers 10A, 10B and 10C through the monitoring lines, respectively.

The phase change-over switches 14AB, 14CX, 14BC, 14AX, 14CA, and 14BX may also be connected to the phases A, B and C, respectively, and further, may also be changed over to the phases C, A and B in connection, or may also be concentratedly changed over all to the phase A, the phase B or the phase C.

In FIG. 11, the control signals for the phase change-over switches from the control center (CC) 11 are sent to the phase change-over slave station 13. Then, the phase change-over slave station 13 issues a change-over command to the corresponding phase change-over switches through the control lines.

For example, in the case where the distribution transformer 10A which is currently connected to the high voltage three-phase load line of the phase A is intended to be changed over to the high voltage three-phase load line of the phase C, a signal in accordance with which a side b terminal will be changed over to a side a terminal in the phase change-over switch 14CX is transmitted from the control center (CC) 11 to the phase change-over slave station 13 to thereby being capable of attaining that purpose.

Figure 12:
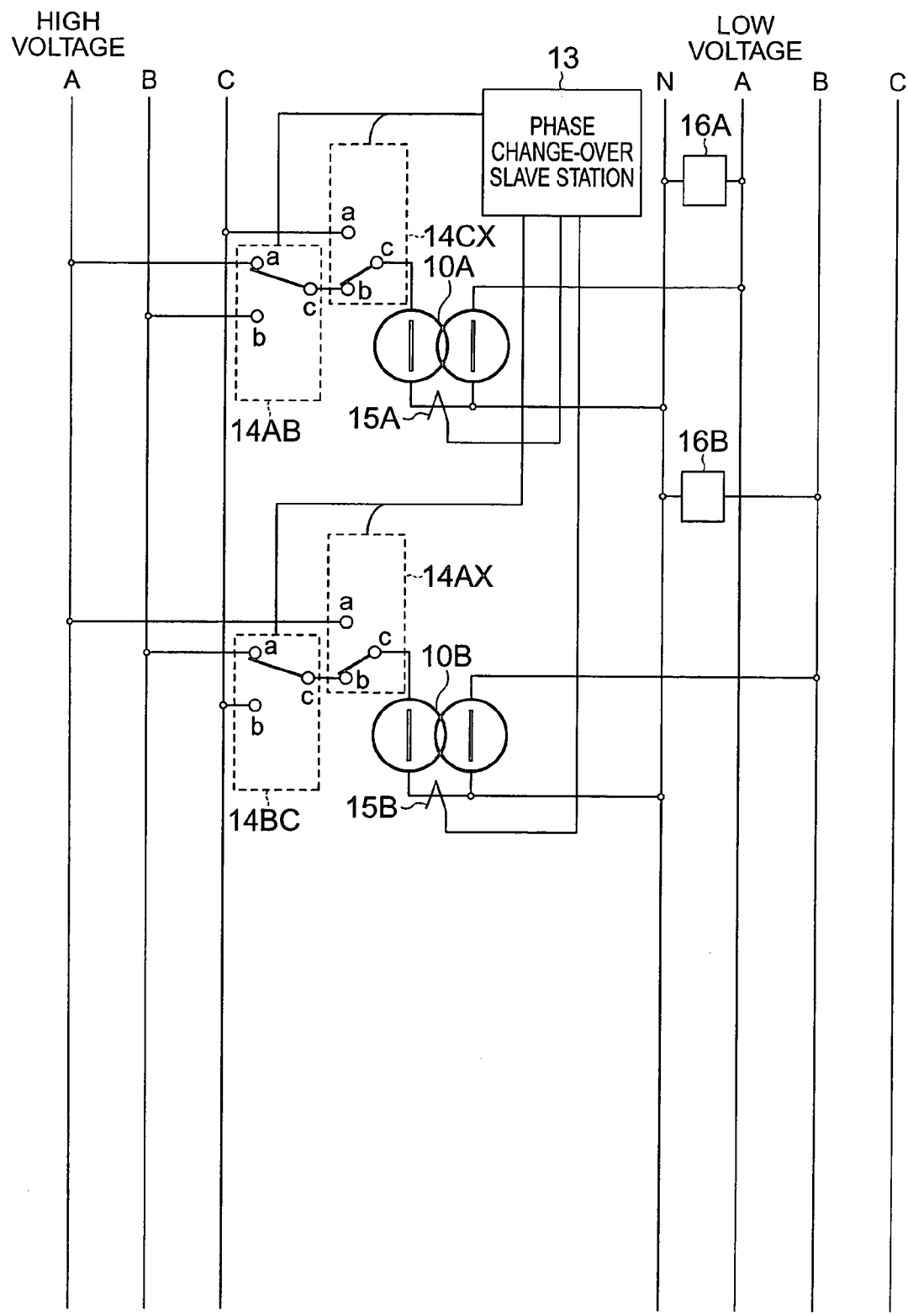
FIG. 12 is a circuit diagram showing an example of connection of distribution transformers when one single-phase transformer is excluded from a configuration shown in FIG. 11.

FIG. 12 is a circuit diagram showing an example of connection of the distribution transformers when one single-phase transformer is excluded from the configuration shown in FIG. 11.

Since the configuration of FIG. 12 is the same as that of FIG. 11 except for the excluded single-phase distribution transformer 10C (and its peripheral equipment), the description thereof is omitted here for the sake of simplicity.

Figure 13:
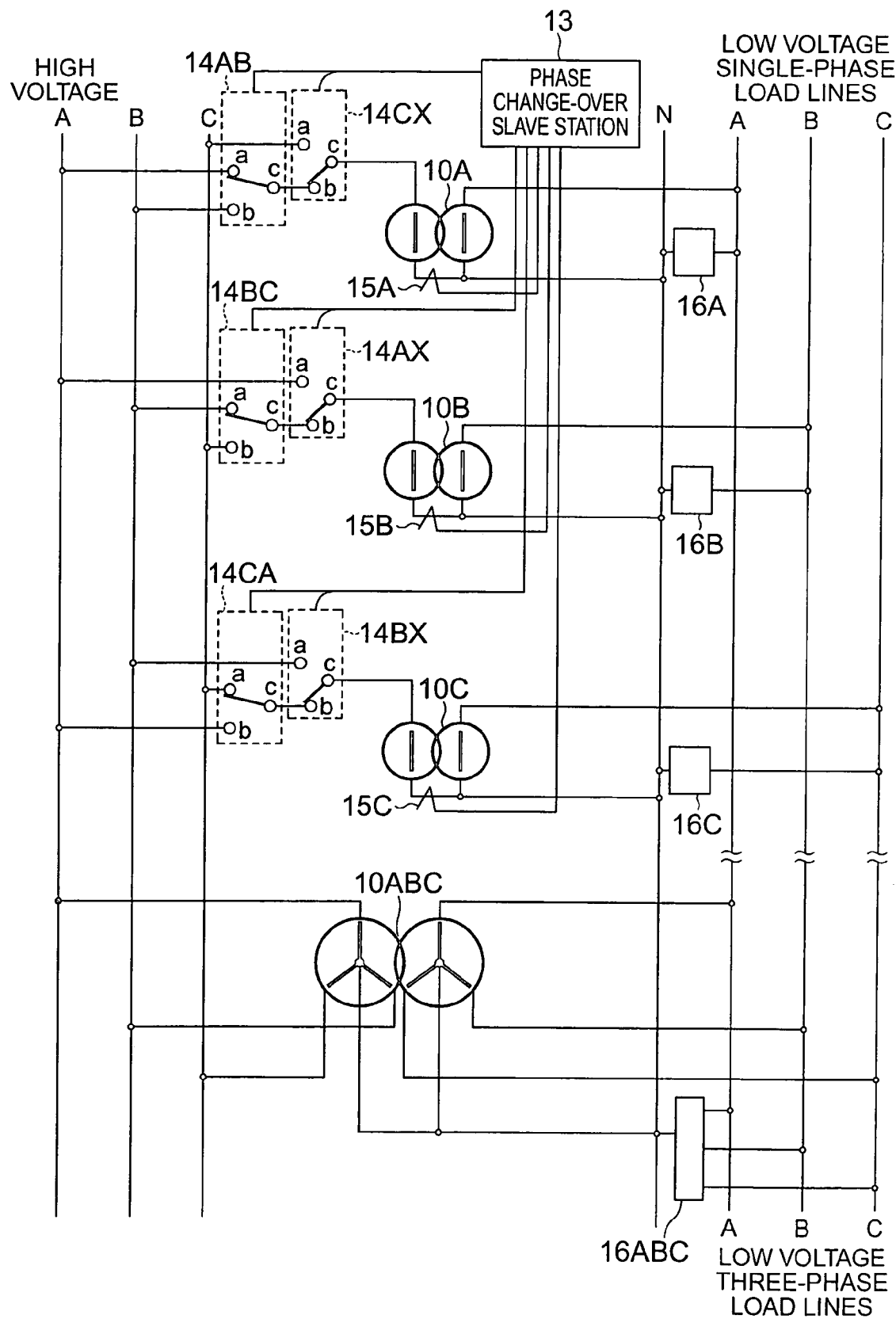
FIG. 13 is a circuit diagram useful in explaining a method of installation of phase change-over switches when three single-phase transformers and one three-phase transformer are installed in a certain load point.

FIG. 13 is a circuit diagram useful in explaining a method of installation of the phase change-over switches when three single-phase transformers and one three-phase transformer are installed at a certain load point.

In FIG. 13, the connection of the single-phase distribution transformers 10A, 10B and 10C across the high voltage three-phase load lines and the low voltage single-phase load lines is the same as that shown in FIG. 11. A three-phase distribution transformer 10ABC is connected across the high voltage three-phase load lines and the low voltage three-phase load lines. In addition, a three-phase load 16ABC is connected to the low voltage three-phase load lines.

In this case, as shown in FIG. 13, the low voltage single-phase load lines and the low voltage three-phase load lines need to be separated from each other because there is a fear in that if the phase order is changed due to the phase change-over, then a revolving direction of a three-phase electric motor is reversed in the three-phase load 16ABC to cause a serious problem.

Since the operation in the case of FIG. 13 is the same as that in the case of FIG. 11, the description thereof is omitted here for the sake of simplicity.

Figure 14:
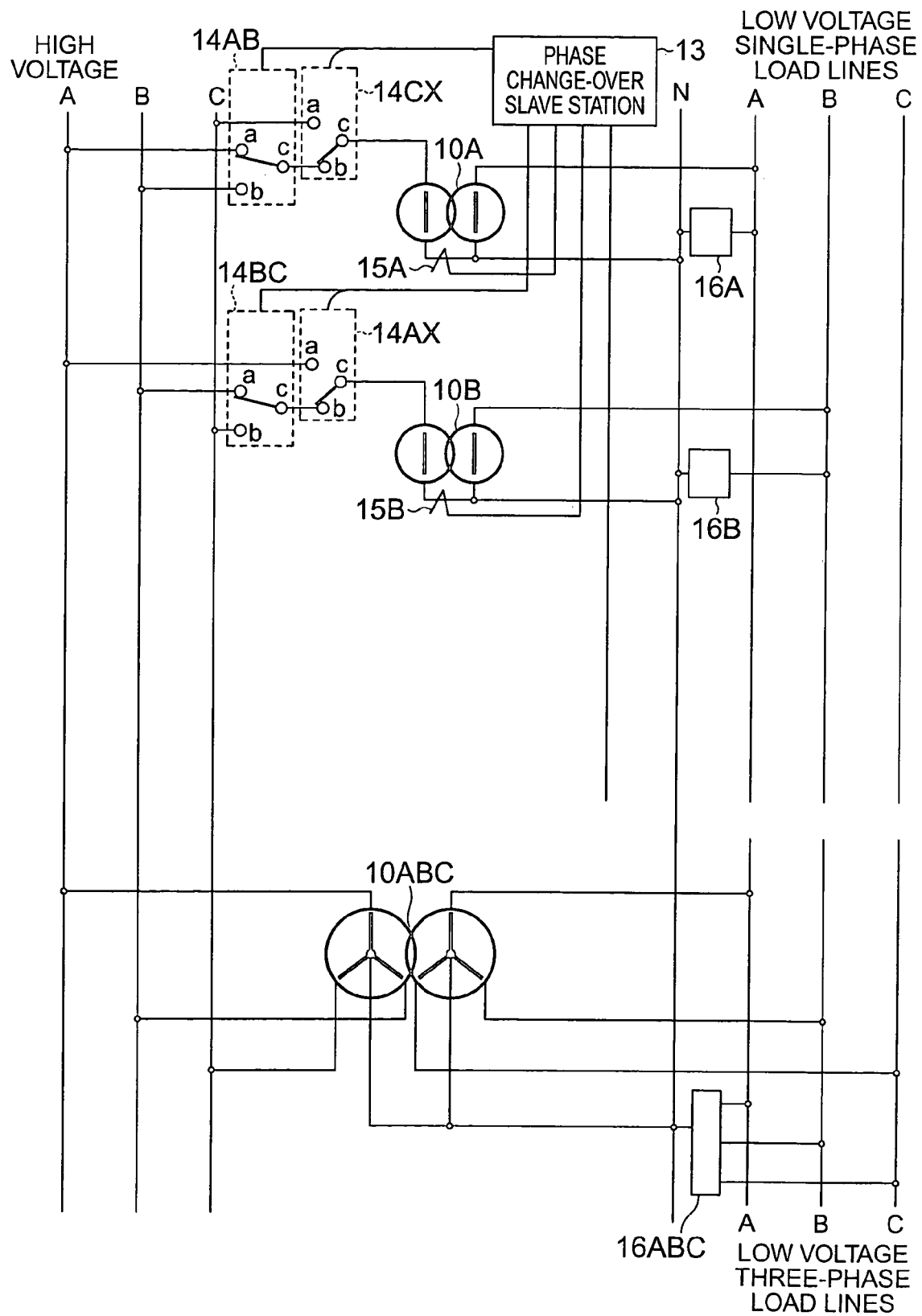
FIG. 14 is a circuit diagram showing an example of connection of distribution transformers when one single-phase transformer is excluded from a configuration shown in FIG. 13.

FIG. 14 is a circuit diagram showing an example of connection of the distribution transformers when one single-phase transformer is excluded from the configuration shown in FIG. 13.

Also in this case, the low voltage single-phase load lines and the low voltage three-phase load lines need to be separated from each other. Since the operation of FIG. 14 is the same as that of FIG. 11, the description thereof is omitted here for the sake of simplicity.

Now, the equipment form of the distribution transformer installation points 003, 004 and 006 in the above-mentioned example of FIG. 9 correspond to a case of FIG. 14.

Before the phase change-over, at the distribution transformer installation points 003 and 004, the single-phase transformer 10A of 100 kVA was connected to the phase A, the single-phase transformer 10B of 50 kVA was connected to the phase B, and the transformer 10ABC for the three-phases of 50 kVA was connected to each phase. Then, it is, however, shown in FIG. 9 that since the magnitude of the zero-phase current is too large and hence the necessity for the phase change-over is caused, 100 kVA of the phase A of the single-phase transformer 10A is changed over to the phase C as it is.

Before the phase change-over, at the distribution transformer installation point 006, the single-phase transformer 10A of 50 kVA was connected to the phase A, the single-phase transformer 10B of 50 kVA was connected to the phase B, and the transformer 10ABC for the three-phases of 50 kVA was connected to each phase. It is shown in FIG. 9 that the phase change-over is caused such that the phase A of the single-phase transformer 10A of 50 kVA is changed over to the phase C.

Note that, using the two phase change-over switches in series is the necessary and minimum means for enabling the changing of the phase A over to the phase B or the phase C to be arbitrarily carried out.

Each of the phase change-over switches 14 and 14' used in the control system for canceling load unbalance of a three-phase circuit according to Embodiment 1 has the two switches each having an ability to open and close the flow of the load current, and hence has a mechanical inter-lock construction in which whenever one of the switches forms a closed circuit, the other necessarily forms an opened circuit. Consequently, it is possible to enhance reliability in the changing a certain phase over to another phase, which results in that unbalance in phase loads can be readily cancelled without anxiety, and hence it is possible to prevent the over-current grounding relay (OCGR) from undergoing malfunction.

In addition, since with respect to each of phase change-over switches 14 and 14', the two phase change-over switches are used in series, not only the changing of a certain phase over to another phase of the three-phase circuit, but also the changing of a certain phase over to the remaining phase of the three-phase circuit can be readily and reliably carried out.

In addition, when carrying out the change-over of the phase loads, the magnitudes of the phase currents are compared with one another, and then a part of the load of the phase in which a maximum current appears is changed over to the phase of the load in which a minimum current is recognized. As a result, the unbalance in the three-phase circuit can be surely cancelled.

Moreover, cooperation with the operating time characteristics of the over-current grounding relay (OCGR) is made on the basis of a current of a phase in which a maximum current requiring the change-over appears. Hence, before the over-current grounding relay undergoes malfunction, it is possible to carry out the control for canceling predetermined unbalance.

What is claimed is:

1. A control system for canceling load unbalance of a three-phase circuit, comprising:

phase current detectors for detecting phase currents caused to flow through a secondary circuit of a current transformer provided in high voltage distribution lines, respectively;

a zero-phase current detector for detecting a zero-phase current caused to flow through a residual circuit of the current transformer;

phase change-over switches through which phases of the high voltage distribution lines, and primary sides of distribution transformers provided across high and low voltage distribution lines are connected to each other;

a control center for, when a magnitude of the zero-phase current detected by the zero-phase current detector is larger than a predetermined value, on the basis of the phase currents of the phases detected by the phase current detectors, respectively, outputting a control signal so that the load of the phase having a maximum current appearing therein is changed over to the phase having a minimum current recognized therein; and a phase change-over slave station for controlling the phase change-over for the phase change-over switches in accordance with the control signal, wherein the control center obtains a limit time for the phase change-over control corresponding to the zero-phase current detected by the zero-phase current detector, and outputs an alarm signal exhibiting that if the time limit elapses, then an over-current grounding relay connected to the residual circuit of the current transformer undergoes malfunction.

2. A control system for canceling load unbalance of a three-phase circuit according to claim 1, wherein the phase change-over switches have a first phase change-over switch and a second phase change-over switch connected in series with each other so that a first phase of the high voltage distribution lines is changed over to a second phase thereof, or the first phase thereof is changed over to a third phase thereof.

3. A control system for canceling load unbalance of a three-phase circuit according to claim 2, wherein each of the first and second phase change-over switches has a first terminal, a second terminal and a common terminal;

the first and second terminals of the first phase change-over switch are connected to the first and second phases of the high voltage distribution lines, respectively; and the first and second terminals of the second phase change-over switch are connected to the third phase of the high voltage distribution lines and the common terminal of the first phase change-over switch, respectively, and the common terminal of the second phase change-over switch is connected to the primary sides of the distribution transformers.

* * * * *